United States Patent
Hardacker et al.

(10) Patent No.: US 8,770,815 B2
(45) Date of Patent: Jul. 8, 2014

(54) ACTIVE BEZEL EDGE LIGHTING WITH DIFFUSER LAYER

(75) Inventors: Robert Hardacker, Escondido, CA (US); Rafael Calderon, San Diego, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1166 days.

(21) Appl. No.: 12/582,188

(22) Filed: Oct. 20, 2009

(65) Prior Publication Data

US 2011/0090694 A1   Apr. 21, 2011

Related U.S. Application Data

(60) Provisional application No. 61/179,304, filed on May 18, 2009.

(51) Int. Cl.
*F21V 5/00* (2006.01)

(52) U.S. Cl.
USPC .... 362/605; 362/16; 362/311.02; 362/311.13

(58) Field of Classification Search
USPC .......... 362/605, 11, 655, 85, 16, 311.02, 362/311.06, 311.13
See application file for complete search history.

(56) References Cited

U.S. PATENT DOCUMENTS

| | | | |
|---|---|---|---|
| 4,232,341 A * | 11/1980 | Watanabe et al. ............ | 348/832 |
| 6,578,972 B1 | 6/2003 | Heirich et al. | |
| 7,209,187 B2 | 4/2007 | Mears et al. | |
| 7,493,177 B2 | 2/2009 | Ledbetter et al. | |
| 7,677,746 B2 * | 3/2010 | Brown ........................... | 362/85 |
| 7,907,841 B2 | 3/2011 | Aoyagi | |
| 7,969,505 B2 | 6/2011 | Saito | |
| 8,156,244 B2 | 4/2012 | Blair | |
| 2002/0018050 A1 | 2/2002 | Turner | |
| 2002/0171624 A1 | 11/2002 | Stecyk et al. | |
| 2002/0186325 A1 | 12/2002 | Mears et al. | |
| 2003/0002246 A1 * | 1/2003 | Kerr ............................... | 361/683 |
| 2003/0068165 A1 | 4/2003 | Hirai et al. | |
| 2004/0149892 A1 * | 8/2004 | Akitt et al. ..................... | 250/221 |
| 2004/0156192 A1 | 8/2004 | Kerr et al. | |

(Continued)

FOREIGN PATENT DOCUMENTS

| | | |
|---|---|---|
| EP | 1168288 | 1/2002 |
| JP | 8149387 | 6/1996 |

(Continued)

OTHER PUBLICATIONS

Robert Hardacker et al., "Feedback System for Optimizing Exposure", file history of U.S. Appl. No. 12/556,084, filed Sep. 9, 2009.

(Continued)

*Primary Examiner* — Jong-Suk (James) Lee
*Assistant Examiner* — Leah S Macchiarolo
(74) *Attorney, Agent, or Firm* — John L. Rogitz

(57) ABSTRACT

A bezel for a TV display has two or more bezel elements, one being more diffusive of light from a source juxtaposed with the bezel assembly than the other element. One element can laterally border the other element or one element can be directly behind the other. More than two bezel elements may be used.

5 Claims, 2 Drawing Sheets

(56) References Cited

U.S. PATENT DOCUMENTS

| | | | |
|---|---|---|---|
| 2004/0204226 A1 | 10/2004 | Foster et al. | |
| 2006/0209527 A1 | 9/2006 | Shin | |
| 2008/0267449 A1 | 10/2008 | Dumas et al. | |
| 2008/0294017 A1 | 11/2008 | Gobeyn et al. | |
| 2009/0021587 A1 | 1/2009 | Snyderman et al. | |
| 2009/0289874 A1* | 11/2009 | Ha | 345/1.3 |
| 2010/0026707 A1* | 2/2010 | Hoogenstraaten et al. | 345/595 |
| 2010/0052548 A1* | 3/2010 | Allard et al. | 315/154 |
| 2010/0053229 A1 | 3/2010 | Krijn et al. | |
| 2010/0201539 A1* | 8/2010 | Kerr et al. | 340/815.42 |
| 2010/0238664 A1* | 9/2010 | Steenbergen | 362/276 |
| 2010/0259828 A1* | 10/2010 | Byeon et al. | 359/609 |
| 2010/0259829 A1* | 10/2010 | Kim et al. | 359/609 |
| 2010/0309369 A1 | 12/2010 | Jarvis et al. | |
| 2011/0018462 A1 | 1/2011 | Lowe et al. | |
| 2011/0018849 A1 | 1/2011 | Lowe et al. | |
| 2011/0051019 A1* | 3/2011 | Hardacker et al. | 348/739 |
| 2011/0128719 A1 | 6/2011 | Tracy et al. | |
| 2011/0188240 A1 | 8/2011 | Simon et al. | |
| 2011/0316807 A1 | 12/2011 | Corrion | |

FOREIGN PATENT DOCUMENTS

| | | |
|---|---|---|
| JP | 11-289502 | 10/1999 |
| JP | 2007194625 | 8/2007 |
| KR | 20-1999-009217 | 3/1999 |
| KR | 20010094205 | 10/2001 |
| KR | 10-2002-0085813 | 11/2002 |
| KR | 20050023209 | 3/2005 |
| KR | 10-2006-0086685 | 8/2006 |
| KR | 1020070022918 | 2/2007 |
| KR | 10-0833616 | 5/2008 |
| WO | 2008065614 | 6/2008 |

OTHER PUBLICATIONS

Robert Hardacker, et al., "Bezel Color Coordingation", file history of U.S. Appl. No. 12/582,274, filed Oct. 20, 2009.

Robert Hardacker, et al. "Bezel Illumination for Digital Devices", file history for U.S. Appl. No. 12/582,401, filed Oct. 20, 2009.

PCT search report in PCT/US2010/034700, the PCT counterpart to the U.S. Appl. No. 12/582,274, which is directed to subject matter related to the present U.S. patent application.

PCT search report in PCT/US2010/034687, the PCT counterpart to the U.S. Appl. No. 12/582,401, which is directed to subject matter related to the present U.S. patent application.

Robert Hardacker, Rafael Calderon, Steven Richman, "Bezel Color Coordination" U.S. Appl. No. 13/189,906, final office action dated Apr. 3, 2013.

Robert Hardacker, Rafael Calderon, Steven Richman, "Bezel Color Coordination" U.S. Appl. No. 13/189,906, amendment in response to final office action filed Apr. 10, 2013.

Robert Hardacker, Rafael Calderon, Steven Richman, "Feedback System for Optimizing Exposure" related U.S. Appl. No. 12/556,084, non-final office action dated Feb. 28, 2013.

Robert Hardacker, Rafael Calderon, Steven Richman, "Feedback System for Optimizing Exposure" U.S. Appl. No. 12/556,084, amendment in response to non-final office action filed Mar. 4, 2013.

* cited by examiner

ACTIVE BEZEL EDGE LIGHTING WITH DIFFUSER LAYER

This application claims priority to U.S. provisional patent app. 61/179,304, filed May 18, 2009.

I. FIELD OF THE INVENTION

The present application relates generally to bezels that surround video displays.

II. BACKGROUND OF THE INVENTION

Video displays may be framed by bezels, which are plastic frames that surround the displays. As understood herein, to improve the visual look and feel of a bezel, creative lighting strategies and bezel construction may be used to enhance the bezel to also promote and enhance the viewability of the display itself.

SUMMARY OF THE INVENTION

A layered bezel assembly has a clear light diffusing layer or bezel element juxtaposed with an element or layer of a different material that can be clear or transluscent colored or even opaque allowing for different appearances of illuminated edges of the assembly.

The layered approach can be from the front to back of the bezel or from the outer edge to the inner edge, such that the outer edge material is darkened or black, leading to a clear or translucent diffusion layer for lighting the inner bezel portion near the display. An outer portion of the bezel thus can be darkened or composed of non-lighted material. In the case of the layered front to back option, the back layer can be composed of traditional bezel composites, while having the front layer on top of it capable of being lighted. Thus, when the front portion is unlit, the bezel appears "normal" like the shiny black plastic bezels currently used, and when the surface translucent layer is lit, the bezel has a colored lit hue.

Accordingly, an apparatus includes a video display such as a flat panel TV display and one or more light sources such as light emitting diodes (LED) juxtaposed with the video display. A bezel assembly frames the video display. The bezel assembly includes at least first and second bezel elements, and the first bezel element is more diffusive of light from the light source than the second bezel element.

In one example embodiment the first bezel element extends laterally beyond the second bezel element relative to the display. The first bezel element can be more diffusive of light than the second bezel element. Alternatively, the first bezel element can be less diffusive of light than the second bezel element. In some cases a third bezel element can be laterally disposed between the first and second bezel elements.

In other examples the first bezel element includes plural sub-elements embedded in the second bezel element and separated from each other by material of the second bezel element.

In still other examples the first bezel element is disposed between the display and the second bezel element and does not laterally extend beyond the second bezel element. In these embodiments the first bezel element can be more diffusive of light than the second bezel element. Alternatively, the first bezel element can be less diffusive of light than the second bezel element.

If desired, the light source may project light parallel to a front surface of the display and at least one of the bezel elements reflects the light perpendicularly away from the display.

In another aspect, an apparatus includes a video display, at least one light source juxtaposed with the video display, and a bezel assembly framing the video display. The light source projects light parallel to a front surface of the display the bezel assembly reflects the light perpendicularly away from the display.

In another aspect, an apparatus includes a TV display and a multi-layer internally illuminated bezel assembly framing the display.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
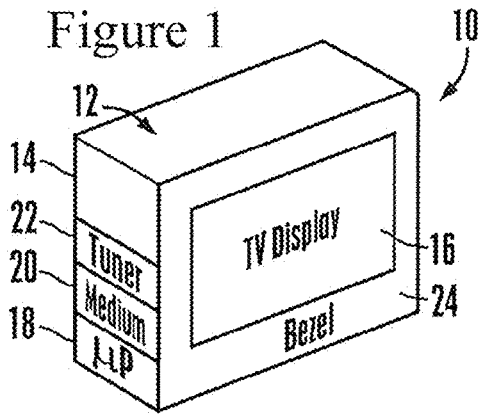
FIG. 1 is a block diagram of an example display system that can use present bezel principles.

Referring initially to FIG. 1, an example display system 10 is shown that includes a TV 12 with TV chassis 14 bearing a TV display 16 such as but not limited to a flat panel matrix or plasma display. The display 16 is controlled by a TV processor 18 accessing a computer readable storage medium 20 to present video images from a selected video source such as a TV tuner 22 or other over the air broadcast receiver or disk player. Other sources of video may be provided, e.g., the Internet through an Internet interface, a home theater, a cable head end, etc.

The computer readable storage medium 20 may be solid state or disk-based storage containing data and instructions to the TV processor 18 to execute portions of the logic divulged below. It is to be understood that while FIG. 1 shows that the processor 18, medium 20, and TV tuner 22 are in the chassis 14, in alternate embodiments one or more of these components may be separately housed in, e.g., a set-top box.

A bezel assembly 24 frames the display 16. When the display is rectangular the bezel assembly 24 likewise is rectangular as shown, extending laterally beyond the display 16 on the sides and on the top and bottom of the display. The bezel assembly 24 typically is made of plastic or glass.

Figure 2:
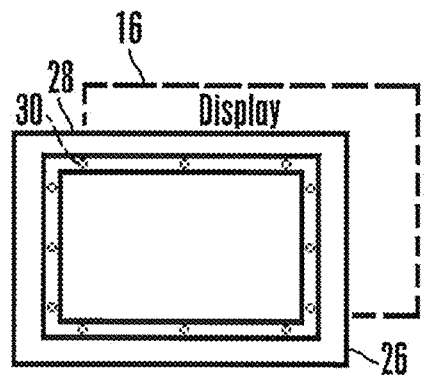
FIG. 2 is a front elevational view of a first example bezel assembly, showing the display and light sources in phantom.

FIGS. 2-6 show various embodiments of the bezel assembly 24. In FIG. 2, a typically plastic first bezel element 26 extends laterally beyond a second typically plastic bezel element 28 relative to the display 16 as shown. The bezel elements 26, 28 are separate layers. In other words, the first bezel element 26 extends beyond the outer perimeter of the second bezel element 28 with the bezel assembly being made in some embodiments using a multi-shot mold. The first bezel element can be less diffusive of light than the second bezel element 28. In this case, the first bezel element 26 can be transparent or more translucent than the second bezel element, which in some cases may be completely opaque. Accordingly, when one or more light sources 30 such as white or colored LEDs that may be disposed behind the front surface of the bezel assembly (embedded in the bezel material or disposed between the bezel assembly and display 16) are illuminated, the effect is to illuminate the outer bezel element 26 and not the inner bezel element 28.

Or, the outer element 26 can be more diffusive of light than the second (inner) bezel element 28, which may be transparent. In such an embodiment the inner element 28 transmits light from the LEDs to the outer element 26, which can be colored plastic, creating a floating effect of color.

The inner element 28 may be opaque and the outer element may be opaque at its inner periphery, tapering in a lateral gradient to a translucent outer periphery. This can be accomplished by partitioning materials from inner to outer periphery.

Figure 3:
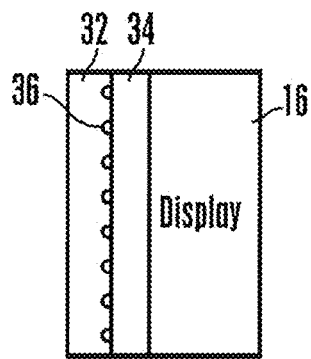
FIG. 3 is a side elevational view of a second example bezel assembly.

FIG. 3 shows that instead of lateral layers, a front bezel element 32 can be positioned in front of an interior bezel element 34 such that the front element 32 does not laterally extend beyond the edges of the interior bezel element 34. In such a case, one or more white or multi-colored light sources 36 may be sandwiched between the bezel elements 32, 34. The front bezel element 32 can be more diffusive of light than the interior bezel element 34 or it can less diffusive. In one embodiment the interior bezel element 34 is black and the front bezel element 32 is clear or colored translucent plastic, such that when the sources 36 are deenergized the interior bezel is visible to appear as a normal black bezel whereas when the sources 36 are energized, the front bezel element 32 becomes illuminated, giving the bezel assembly a colored hue.

As was the case with the embodiment of FIG. 2, in the embodiment of FIG. 3 the transition from one diffusion material to another may gradual by, e.g., stacking triangles up to form a rectangle.

Figure 4:
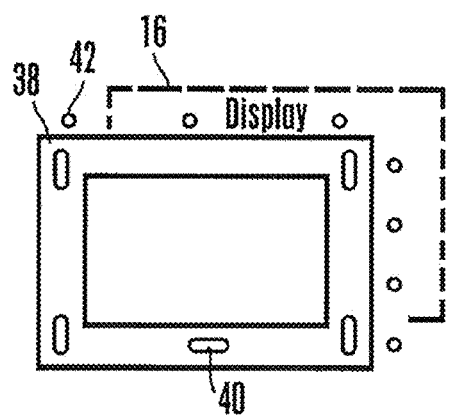
FIG. 4 is a front elevational view of a third example bezel assembly, showing the display in phantom.

FIG. 4 shows that a first bezel element 38 can surround the display 16 and a second bezel element can include comprises plural sub-elements 40 which are embedded in the first bezel element 38 and which are separated from each other by material of the first bezel element. The sub-elements 40 have different light diffusion characteristics from the first bezel element 38 and may even have differing light diffusion characteristics as between each other. One or more light sources 42 such as LEDs may be disposed between the bezel element 38 and the display.

Figure 5:
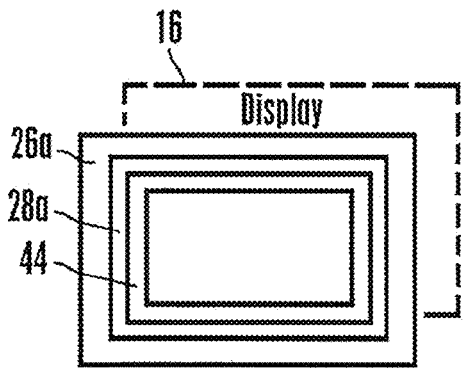
FIG. 5 is a front elevational view of a fourth example bezel assembly, showing the display and light sources in phantom.

FIG. 5 shows that three bezel elements each of which successively laterally overlaps the immediate inner edge can be provided. Specifically, an inner bezel element 28a can be laterally contiguous with the display 16, a middle bezel element 44 can be laterally contiguous to with the inner element 28a and laterally extend beyond it, and an outer bezel element 26a can be laterally contiguous to with the middle element 44 and laterally extend beyond it. The bezel elements 26a, 44, 28a may have respective light diffusion characteristics and light sources may be provided in the bezel as described above.

Figure 5A:
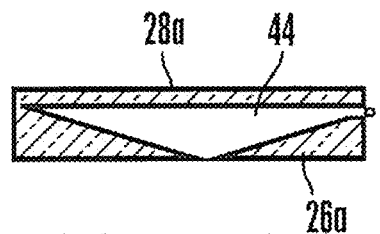
FIGS. 5A-5C show additional views of the example shown in FIG. 5, specifically, top view of the left hand side of the display, front view of the display, and front side view of the left hand side, respectively.
Figure 5B:
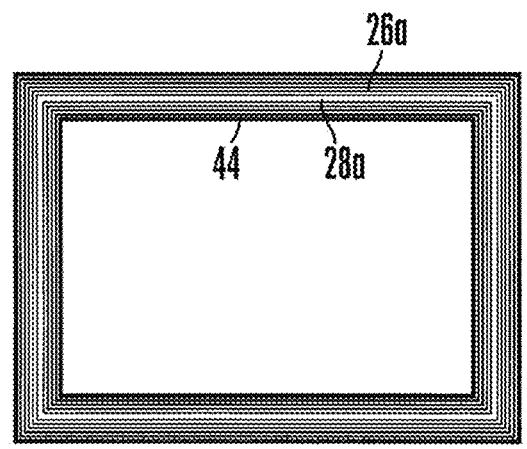
Figure 5C:

In alternate embodiments, the inner and outer elements 28a, 26a may both be relatively darker although still permitting the passage of light and the middle element 44 may be lighter such that when the LEDs are lit, the inner element 44 appears to illuminated with the color of LED that is lit and the inner and outer elements appear dark, or the default color of the bezel. When the LEDs are not lit all three elements may appear dark, or the default color of the bezel. FIGS. 5A and 5B illustrate this. In FIG. 5A, the shape of the middle element 44 looking down on the TV display is triangular as shown.

Figure 6:
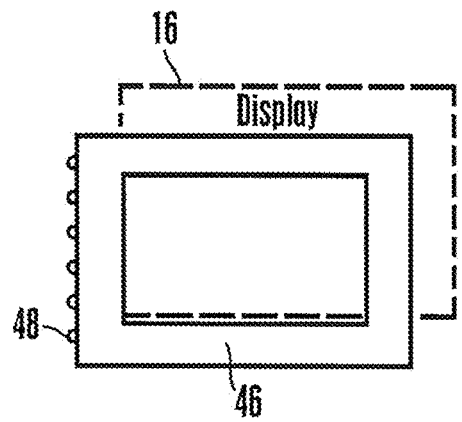
FIG. 6 is a front elevational view of a fifth example bezel assembly, showing the display and light sources in phantom.
Figure 8:
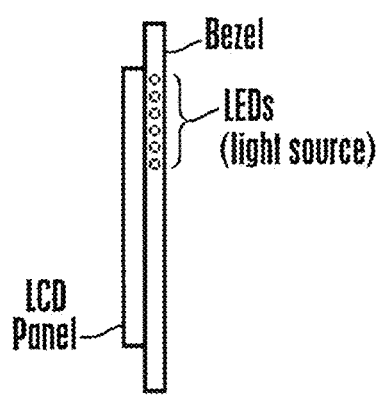
FIGS. 7 and 8 show additional views of the example shown in FIG. 6.
Figure 7:
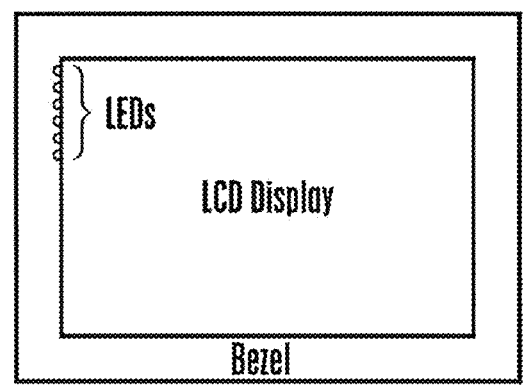

A bezel assembly 46 is shown in FIG. 6 that may be implemented by any of the bezel assemblies described previously. In FIG. 6, one or more light sources 48 such as LEDs are situated laterally beyond the outer edge of the bezel assembly 46. The light sources 48 project light parallel to the front surface of the display 16 essentially into the edge of the bezel assembly 46, with the bezel assembly 46 reflecting the light perpendicularly away from the display toward the viewer. FIGS. 7 and 8 show additional views of the feature shown in FIG. 6.

While the particular ACTIVE BEZEL EDGE LIGHTING WITH DIFFUSER LAYER is herein shown and described in detail, it is to be understood that the subject matter which is encompassed by the present invention is limited only by the claims.

What is claimed is:

1. Apparatus comprising:
    video display;
    at least one light source juxtaposed with the video display; and
    a bezel assembly framing the video display, the bezel assembly including:
    at least first and second transparent or translucent bezel elements, wherein the light source projects light parallel to a front surface of the display at least one of the bezel elements of the bezel assembly reflects the light perpendicularly away from the display; and
    a third bezel element laterally disposed between the first and second bezel elements.

2. The apparatus of claim 1, wherein the first bezel element is more diffusive of light from the light source than the second bezel element.

3. The apparatus of claim 2, wherein the first bezel element extends laterally beyond the second bezel element relative to the display.

4. The apparatus of claim 2, wherein the first bezel element is established by plural sub-elements embedded in the second bezel element and separated from each other by material of the second bezel element.

5. The apparatus of claim 2, wherein the first bezel element is disposed between the display and the second bezel element and does not laterally extend beyond the second bezel element.

* * * * *